(12) United States Patent
Chua et al.

(10) Patent No.: US 9,355,330 B2
(45) Date of Patent: May 31, 2016

(54) IN-VIDEO PRODUCT ANNOTATION WITH WEB INFORMATION MINING

(75) Inventors: Tat Seng Chua, Singapore (SG); Guangda Li, Singapore (SG); Zheng Lu, Singapore (SG); Meng Wang, Singapore (SG)

(73) Assignee: National University of Singapore, Singapore (SG)

( * ) Notice: Subject to any disclaimer, the term of this patent is extended or adjusted under 35 U.S.C. 154(b) by 209 days.

(21) Appl. No.: 14/111,149

(22) PCT Filed: Apr. 11, 2012

(86) PCT No.: PCT/SG2012/000127
§ 371 (c)(1),
(2), (4) Date: Oct. 10, 2013

(87) PCT Pub. No.: WO2012/141655
PCT Pub. Date: Oct. 18, 2012

(65) Prior Publication Data
US 2014/0029801 A1    Jan. 30, 2014

Related U.S. Application Data

(60) Provisional application No. 61/474,328, filed on Apr. 12, 2011.

(51) Int. Cl.
*G06K 9/00* (2006.01)
*G06K 9/46* (2006.01)
*G06F 17/30* (2006.01)

(52) U.S. Cl.
CPC ........ *G06K 9/4642* (2013.01); *G06F 17/30799* (2013.01); *G06K 9/00744* (2013.01)

(58) Field of Classification Search
None
See application file for complete search history.

(56) References Cited

U.S. PATENT DOCUMENTS

| 6,560,281 B1 | 5/2003 | Black et al. |
| 7,783,135 B2 | 8/2010 | Gokturk et al. |

(Continued)

FOREIGN PATENT DOCUMENTS

| JP | 2008-146494 A | 6/2008 |
| JP | 2011-507603 A | 3/2011 |
| WO | 2009/082531 A1 | 7/2009 |

OTHER PUBLICATIONS

PCT International Search Report and Written Opinion, PCT Application No. PCT/SG2012/000127, Jun. 6, 2012, ten pages.
English Translation of Japanese Publication No. 2008-146494 A1(cited above), 16 pages.

(Continued)

*Primary Examiner* — Tahmina Ansari
(74) *Attorney, Agent, or Firm* — Kilpatrick Townsend & Stockton LLP

(57) ABSTRACT

A system provides product annotation in a video to one or more users. The system receives a video from a user, where the video includes multiple video frames. The system extracts multiple key frames from the video and generates a visual representation of the key frame. The system compares the visual representation of the key frame with a plurality of product visual signatures, where each visual signature identifies a product. Based on the comparison of the visual representation of the key frame and a product visual signature, the system determines whether the key frame contains the product identified by the visual signature of the product. To generate the plurality of product visual signatures, the system collects multiple training images comprising multiple of expert product images obtained from an expert product repository, each of which is associated with multiple product images obtained from multiple web resources.

17 Claims, 8 Drawing Sheets

(56) References Cited

U.S. PATENT DOCUMENTS

| | | | |
|---|---|---|---|
| 7,894,665 B2* | 2/2011 | Tseng et al. | 382/159 |
| 2002/0114522 A1 | 8/2002 | Seeber | |
| 2007/0083815 A1* | 4/2007 | Delorme et al. | 715/723 |
| 2008/0059872 A1* | 3/2008 | Tseng et al. | 715/231 |
| 2011/0106656 A1* | 5/2011 | Schieffelin | 705/26.9 |
| 2014/0029801 A1* | 1/2014 | Chua et al. | 382/103 |

OTHER PUBLICATIONS

Office Action issued Feb. 8, 2016 in co-pending Japanese Patent Application No. 2014-505107 (plus translation in English), 8 pages.

Yanai, Keiji, "[Invited Talk] Machine Learning in Object Recognition," IEICE Technical Report, vol. 110, No. 76, dated Jun. 14-15, 2010 (plus abstract in English) 12 pages.

* cited by examiner 810A  810B 820A  820B 830A  830B

IN-VIDEO PRODUCT ANNOTATION WITH WEB INFORMATION MINING

CROSS REFERENCE TO RELATED APPLICATIONS

This application claims the benefit of U.S. Provisional Application No. 61/474,328, filed Apr. 12, 2011, entitled "In-Video Product Annotation with Web Information Mining," which is incorporated by reference in its entirety.

BACKGROUND

Described embodiments relate generally to product annotation in a video and specifically to in-video product annotation using web information mining.

With the rapid advances in storage devices, networks and compression techniques, video data from different domains are growing at an explosive rate. Video annotation (also widely known as video concept detection or high-level feature extraction), which aims to automatically assign descriptive concepts to video content, has received intensive research interests over the past few years. However, most existing works on automatic video annotation focus on high level concepts, such as events (e.g., airplane crash and running), scenes (e.g., sundown and beach) and object categories (e.g., car and screen), and there is few research on annotating specific product concepts, such as iPhone in an iPhone video advertisement.

Annotation of product concepts is of great importance to many applications such as video browsing, searching and advertising. Research on the query log of web video search shows that users are more frequently use specific queries than general concepts. Further, product annotation is able to significantly improve the relevance of video advertising. However, automated annotation of products is challenging because of the insufficiency of training data and the difficulty in generating appropriate visual representations.

The first challenge of automated product annotation lies on the training data for annotation. Existing learning-based video annotation approach heavily relies on the quality of training data, but manually collecting training samples is time-consuming and labor intensive. In particular, there is a multi-view problem for product images. A specific product usually has different views, such as frontal, side and the back views, and these views can be quite visually different. Therefore, there is a need to collect training data that are descriptive for different views of a product.

The second challenge is the effective visual representation. Bag of Visual Words (BoVW) feature is a popular approach and has demonstrated its effectiveness in many applications, such as image classification, clustering, and retrieval. To generate a BoVW representation of an image, Scale Invariant Feature Transform (SIFT) descriptors on multiple detected keypoints or by densely sampling patches of a product image are extracted and quantized into visual words. A BoVW histogram is generated to describe the product image. However, the descriptors of an image are about the whole image and not the product parts contained in the image and contain a lot of noise for product annotation.

SUMMARY

Embodiments of the invention provide product annotation in a video to one or more users using product training images from web mining.

In one embodiment, a computer system provides services of product annotation in a video to one or more users. The system receives a video from a user, where the video includes multiple video frames. The system extracts multiple key frames from the video and generates a visual representation of the key frame. The system compares the visual representation of the key frame with a plurality of product visual signatures, where each visual signature identifies a product. To generate the plurality of product visual signatures, the system collects multiple training images comprising multiple of expert product images obtained from an expert product repository, each of which is associated with multiple product images obtained from multiple web resources. Based on the comparison of the visual representation of the key frame and a product visual signature, the system determines whether the key frame contains the product identified by the visual signature of the product.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

It is to be understood that the Figures and descriptions of the invention have been simplified to illustrate elements that are relevant for a clear understanding of the embodiments of the invention, while eliminating, for the purpose of clarity, many other elements found in a typical web-based video player and method of using the same. Those of ordinary skill in the art may recognize that other elements and/or steps are desirable and/or required in implementing the invention.

However, because such elements and steps are well known in the art, and because they do not facilitate a better understanding of the invention, a discussion of such elements and steps is not provided herein. The disclosure herein is directed to all such variations and modifications to such elements and methods known to those skilled in the art.

Figure 1:
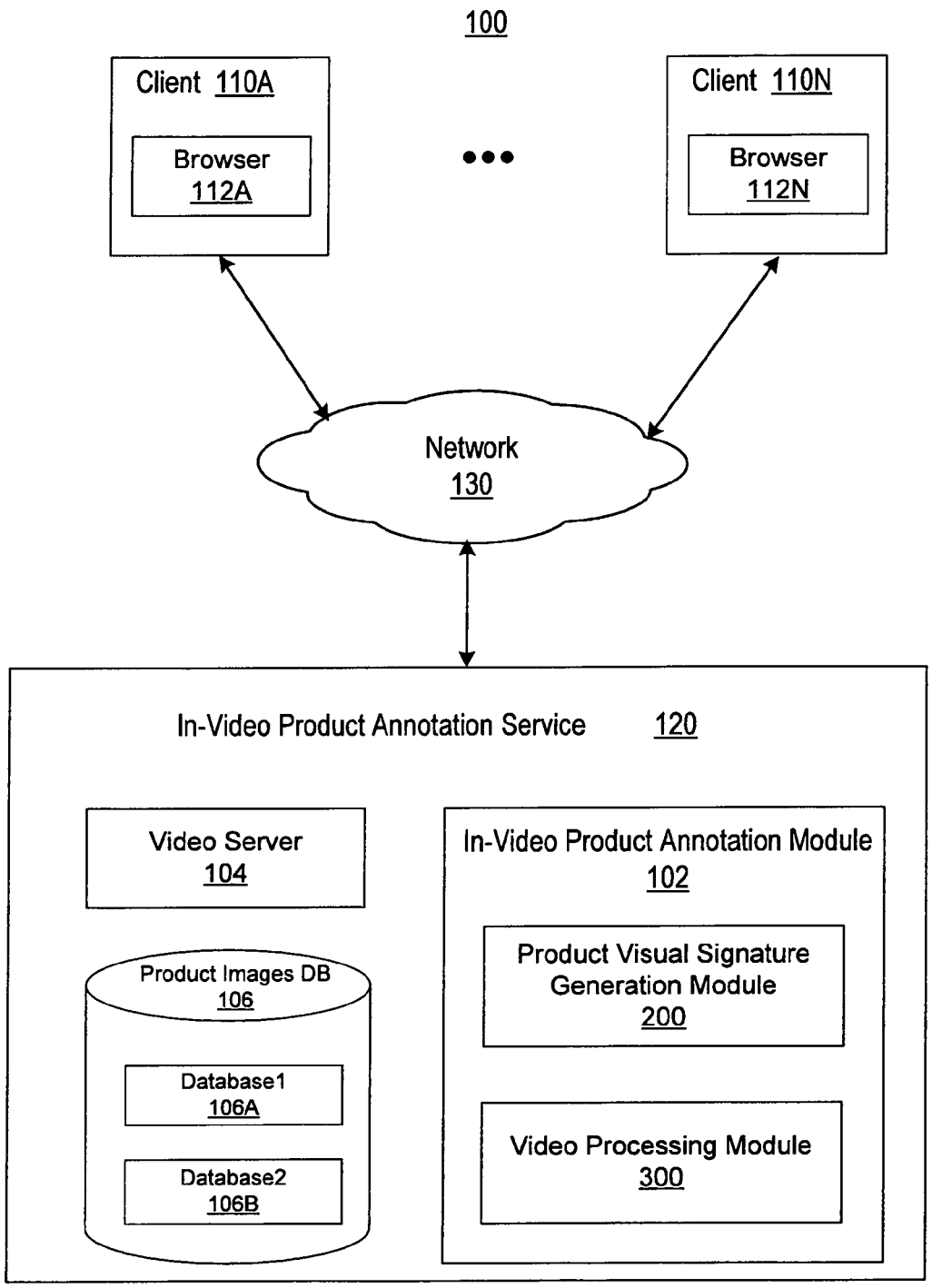
FIG. 1 is a block diagram of a computing environment configured to provide in-video product annotation service to clients.

FIG. 1 is a block diagram of a computing environment 100 configured to provide in-video product annotation service to clients 110. Multiple users/viewers use clients 110A-N to provide video streams to an in-video product annotation service 120 and request the in-video product annotation service 120 to annotate the products contained in the video frames of the video streams. The product annotation service 120 stores the video streams and responds to the requests with product detection and annotation results to the clients 110. Each client 110 executes a browser 112 for browsing the video streams and product annotation results from the product annotation service 120. Other embodiments can have different configurations.

Turning to the individual entities illustrated on FIG. 1, each client 110 is used by a user to use services provided by the in-video product annotation service 120. For example, a user uses a client 110 to browse a video, request annotation of a product contained in the video and receive the product detection and annotation results from the product annotation service 120. The client 110 can be any type of computer device, such as a personal computer (e.g., desktop, notebook, and laptop) computer, as well as devices such as a mobile telephone or personal digital assistant that has the capability to record video content. The client 110 typically includes a processor, a display device (or output to a display device), a local storage, such as a hard drive or flash memory device, to which the client 110 stores data used by the user in performing tasks, and a network interface for coupling to the in-video product annotation service 120 via the network 130.

The network 130 enables communications between the clients 110 and the in-video product annotation service 120. In one embodiment, the network 130 is the Internet, and uses standardized internetworking communications technologies and protocols, known now or subsequently developed that enable the clients 110 to communicate with the in-video product annotation service 120. In another embodiment, the network 130 is a cloud computing network and includes one or more components of the in-video product annotation service 120.

In one embodiment, there are two stages to detect and annotate products within a video, the product visual signature generation stage and runtime video processing stage. The visual signature generation stage includes three components: collection of high-quality visual examples of products from a repository, e.g., AMAZON™, expansion of the collected visual examples with Internet product images search results, and generation of visual signature from training examples comprising the high-quality visual examples of products and their corresponding product images from the search results. The visual signatures of a variety of known products are stored in a product visual signature file.

The runtime video processing stage includes two components, feature extraction and product annotation. For an input video stream, the product annotation service 120 identifies a set of key frames of the video stream, and for each key frame, the product annotation service 120 extracts visual features (e.g., Scale Invariant Feature Transform (SIFT) descriptors) and generates a visual representation of the extracted features (e.g., the Bag of Visual Words (BoVW) histograms). The product annotation service 120 performs production annotation by comparing the visual signature of each product stored in the visual signature file with the BoVW histogram of each key frame of the input video.

In the embodiment illustrated in FIG. 1, the in-video product annotation service 120 has an in-video product annotation module 102, a video server 104 and a product images database 106. The in-video product annotation module 102 comprises a product visual signature generation module 200 for product visual signature generation and a video processing module 300 for processing input videos from clients 110. The video server 104 stores the videos streams received from the clients 110 and annotated video frames of the videos streams. The product images database 106 comprises two sub-databases: database 1 (106A) and database 2 (106B), to store high-quality product images obtained from one or more online product merchants, such as AMAZON™, and related product images collected through Internet search.

The product images from a known product merchant generally have high visual quality, but the number of them for a given product can be limited. For a given product, the number of related images of the product through Internet search using various search engines, such as GOOGLE™ can be large but noisy (e.g., containing textual information unrelated to the product). The product annotation service 120 filters the related product images obtained from the Internet search results based on the high quality product images to generate product visual signatures, and uses the product visual signatures to detect and annotate products in a video stream. To simplify one embodiment of the invention, the high-quality product images from a known merchant are referred to as "expert product images," and for a given expert product image, its associated images obtained from Internet search are referred to as "extended product images."

In-Video Product Annotation—Visual Signature Generation

Figure 2:
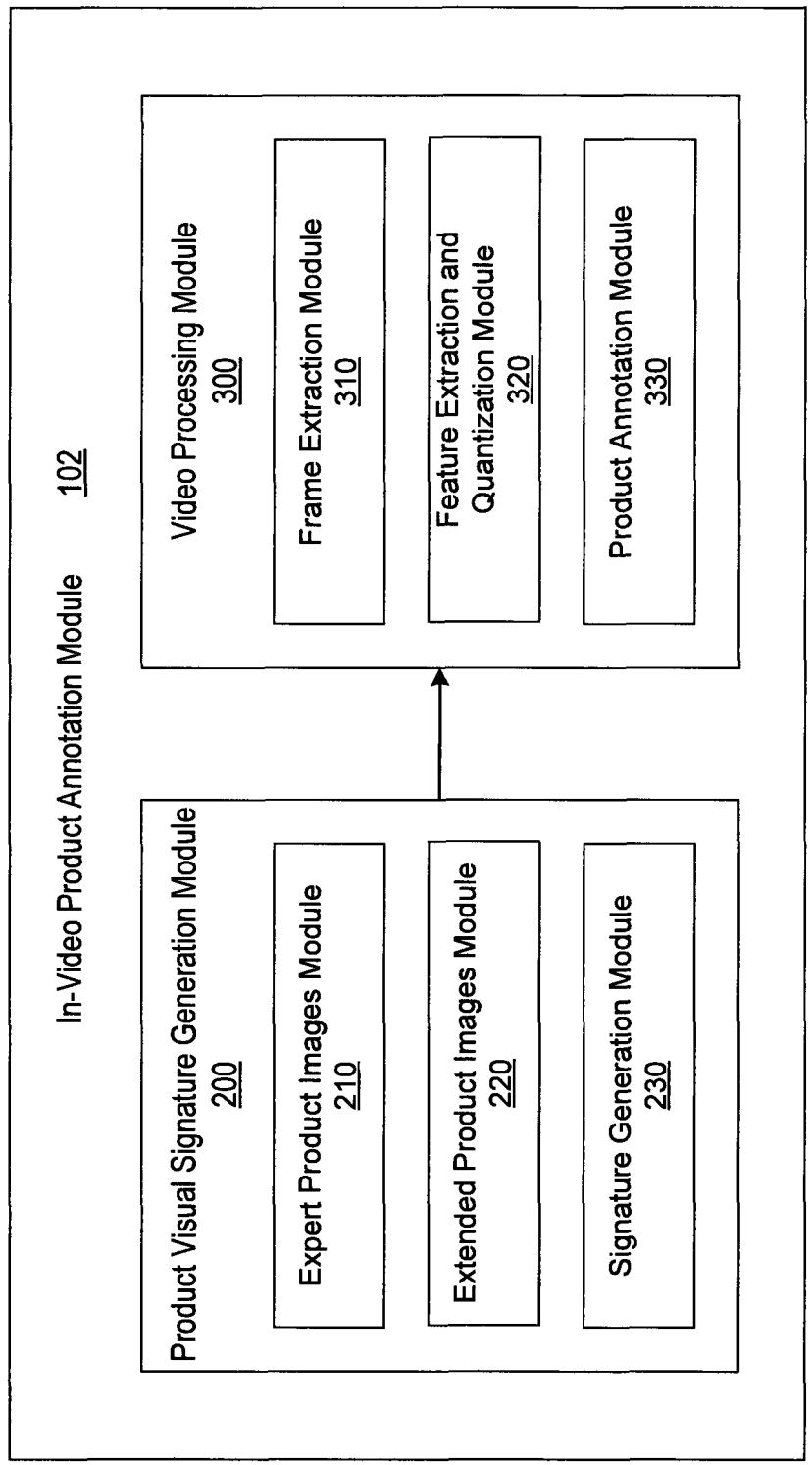
FIG. 2 is a block diagram of an in-video product annotation module to generate product visual signatures and annotate products detected in a video stream.

FIG. 2 is a block diagram of an in-video product annotation module 102 to generate product visual signatures and annotate products detected in a video stream according to one embodiment. The product annotation module 102 comprises a product visual signature generation module 200 and a video processing module 300. The product visual signature generation module 200 includes an expert product images module 210, an extended product images module 220 and a visual signature generation module 230. The video processing module 300 includes a frame extraction module 310, a feature extraction and quantization module 320 and a product annotation module 330.

The product visual signature generation module 200 is configured to generate product visual signatures. The expert product images module 210 is configured to collect high-quality visual examples of products (e.g., expert product images in different views, such as frontal, side and back views). In one embodiment, the expert product images module 210 collects the expert product images from AMAZON™ for a variety of consumer products, such as digital cameras, cars and digital phones.

The expert product images of a given product are often too few for constructing a good visual signature for the product. For example, numbers of expert product images collected from AMAZON™ for a product vary from 1 to 8. On the other hand, there are plenty of product images in different sizes and views available on the Internet, which can be easily accessed through image search engines. In one embodiment, the extended product images module 220 is configured to collect, from the Internet, associated images of a product that has one or more expert product images. For example, for each expert product image, the product name is used as a search query for associated product images in the Internet using GOOGLE™ search engine. The process is to expand the expert product images using the web product image database.

The images from the Internet search contain a lot of noise, e.g., text information (such as title surrounding text, many of which are irrelevant to the search query). Before the signature generation module 230 generates visual signatures of products, the signature generation module 230 re-ranks the extended product images from the Internet search results based on the expert product images. For each expert product image, a pre-determined number of extended product images that are near to the expert product image are selected as the result of the filtering. For a given product, the expert product images and the filtered extended product images form a set of positive training images for the product, from which the signature generation module 230 generates a visual signature for the product. The collection of training images of known products can be automated to improve the in-video product annotation system performance.

To filter the extended product images associated with an expert product image, the signature generation module 230 extracts the visual features of the expert product image and its associated extended product images. In one embodiment, the visual features of the product images are Bag of Visual Words (BoVW) features. The signature generation module 230 extracts one or more SIFT descriptors on several detected key points or by densely sampling patches of each product image and quantizes the SIFT descriptors into multiple visual words. A BoVW histogram is generated from the quantized SIFT descriptors to describe each image. For example, the signature generation module 230 uses a visual feature detection and extraction method, e.g., Difference-of-Gaussian method, to extract 128-dimension SIFT features from a product image and groups the SIFT features into 160,000 clusters with hierarchical K-means. The product image is represented by a 160,000-dimensional BoVW histogram.

For each expert product image, the signature generation module 230 selects a pre-determined a number of nearest neighbors from the extended product images associated with the expert product image based on a similarity measure defined in Equation (1) below:

$$sim(x, y) = \frac{\sum_{d=1}^{D} \min\{(x_d), (y_d)\}}{\min\left\{\sum_{d=1}^{D} x_d, \sum_{d=1}^{D} y_d\right\}} \quad (1)$$

where x and y are two BoVW histograms and D is the length of the histogram. In this way, the signature generation module 230 obtains kn positive training images for a given product, where k is the number of expert product images and n is the pre-determined nearest neighbors (i.e., the extended product images) of the expert product image.

Figure 3:
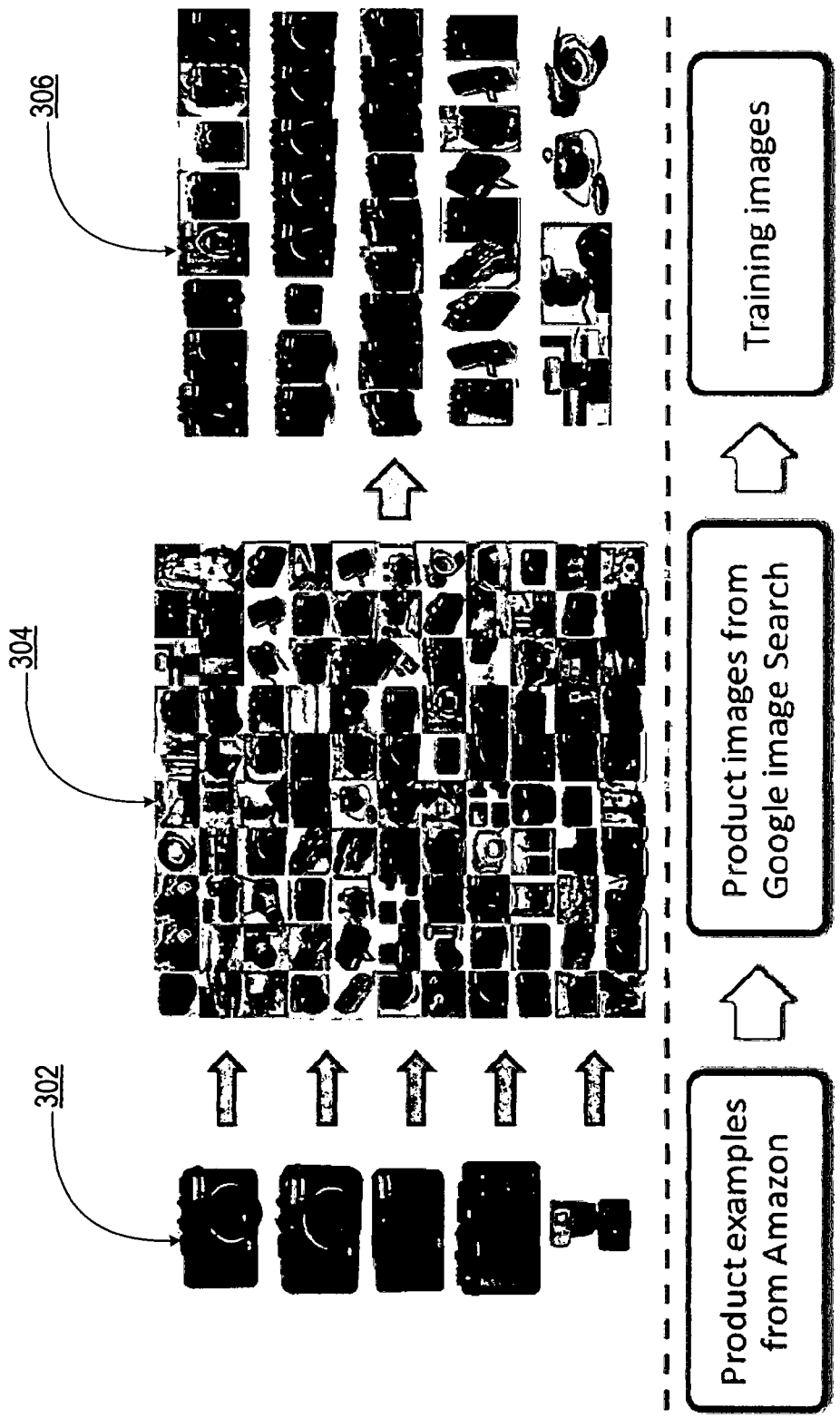
FIG. 3 is an example of collecting training images for in-video product annotation process according to one embodiment of the invention.

To further illustrate collecting in-video product annotation training images, FIG. 3 provides an example of training data collection process for digital camera Canon 40D. The product visual signature generation module 200 collects five expert product images 302 of the camera in different views from online merchant AMAZON™. For each expert product image, the product visual signature generation module 200 searches the Internet using GOOGLE™ search engine to collect a number of related product images 304. Because the product images obtained from the Internet search can be noisy (e.g., containing text unrelated to the product), the product visual signature generation module 200 filters the related product images based on the expert product images. For example, for each expert product image, the product visual signature generation module 200 applies a correlative sparsification described below to reduce the noise by selecting a pre-determined number of nearest neighbors of the product images from the Internet search. The selection of related product image is based on a similarity measure between the related product image and its corresponding expert product image. As a result of the filtering, the product visual signature generation module 200 obtains a set of training examples 306 for digital camera Canon 40D, where the product visual signature generation module 200 generates a visual signature for digital camera Canon 40D.

To effectively annotate a product contained in a product image represented in a high dimensional feature space, the signature generation module 230 generates a template for annotation by averaging positive training images of the product. In one embodiment, the signature generation module 230 merges the visual representation of multiple training images of a product to generate an accumulated histogram for the product. Since there are many noises caused by the descriptors from image background, there are actually many noisy bins in the accumulated histogram.

One approach to reducing the noise is to adopt L1-sparsification described in Equation (2), which fits the L1-regularized least square optimization problem, $$\operatorname*{argmin}_{v_1} \|v_i - \bar{v}_i\|_2^2 + \lambda_1 \|v_i\|_1 \quad (2)$$

where $\|.\|_2$ and $\|.\|_1$ indicate the 2-norm and 1-norm, respectively. The parameter $\lambda_1$ modulates the effect of L1 norm, $\bar{v}_i$ is the original accumulated BoVW histogram for the i-th product, and $v_i$ is the to-be-learned visual signature. The first term of Equation (2) keeps the obtained signature to be close to the original one, while the second term minimizes the 1-norm value of the obtained visual signature, which makes the signature sparse.

It is noted that several products of same class/category have close appearances. For example, the products Canon 40D and Nikon D90 have very close appearances. Thus, the histogram representation of these two products should be very close. To reflect the closeness of images of products of a same class, the signature generation module 230 generates visual signatures of products collectively. In one embodiment, the signature generation module 230 modifies the visual signature generation defined in Equation (2) by adding a graph Laplacian term to Equation (2) as follows:

$$\operatorname*{argmin}_{\{v_1, v_2, \cdots, v_n\}} \sum_{i=1}^{n} \|v_i - \bar{v}_i\|_2^2 + \lambda_1 \sum_{i=1}^{n} \|v_i\|_1 + \lambda_2 \sum_{i=1}^{n}\sum_{j=1}^{n} w_{ij} \|v_i - v_j\|_2^2 \quad (3)$$

where $w_{ij}$ is the similarity between product i and j, and $\lambda_2$ is the parameter that modulates the effect of the graph Laplacian term. The graph Laplacian term, $$\sum_{i=1}^{n}\sum_{j=1}^{n} w_{ij} \|v_i - v_j\|_2^2$$

joints the signatures of all products.

Equation (3) can be solved using an optimization approach. Assuming that all the visual signatures except $v_i$ are fixed. The problem described by Equation (3) can be rewritten as Equation (4) below:

$$\underset{v_i}{\operatorname{argmin}} \|v_i - \overline{v}_i\|_2^2 + \lambda_1 \|v_i\|_1 + \lambda_2 \sum_{j=1}^{n} w_{ij} \|v_i - v_j\|_2^2 \qquad (4)$$

The visual signature $v_i$ is defined by Equation (5) as:

$$\underset{v_i}{\operatorname{argmin}} \left\| \begin{pmatrix} I \\ \sqrt{\lambda_2 w_{i1}} I \\ \sqrt{\lambda_2 w_{i2}} I \\ \cdots \\ \sqrt{\lambda_2 w_{in}} I \end{pmatrix} v_i - \begin{pmatrix} \overline{v}_i \\ \sqrt{\lambda_2 w_{i1}} v_1 \\ \sqrt{\lambda_2 w_{i2}} v_2 \\ \cdots \\ \sqrt{\lambda_2 w_{in}} v_n \end{pmatrix} \right\|_2^2 + \lambda_1 \|v_i\|_1 \qquad (5)$$

where I is the D*D identity matrix, and the visual signature generation is represented as a L1-regularized least square optimization problem. In one embodiment, the signature generation module 230 uses an interior-point method to solve the problem defined in Equation (5). The visual signature of a product represents the ground truth of the product, which can be used to determine whether a video frame of a video stream contains the product at runtime.

The similarity between two sets of product images is defined by Equation (6) as:

$$w_{ij} = \frac{1}{2|P_i|} \sum_{k=1}^{|P_i|} \max_{p \in P_j} sim(p_i^{(k)}, p) + \frac{1}{2|P_j|} \sum_{k=1}^{|P_j|} \max_{p \in P_i} sim(p_j^{(k)}, p) \qquad (6)$$

where $|p_i|$ and $|p_j|$ the number of images for image sets $P_i$ and $P_j$ and $P_i^{(k)}$ indicates the k-th product in the set $P_i$, and sim(.,.) is the similarity of an image pair from different sets. The similarity measure defined in Equation (6) has the following properties:

(1) $w_{ij}=w_{ji}$: the similarity is symmetry;
(2) $w_{ij}=1$ if $P_i=P_j$: the similarity of two products is 1 if their image sets are identical;
(3) $w(p_i, p_j)=0$ if and only if sim(p', p")=0 for every p'∈$P_i$, and p"∈$P_j$: the similarity is 0 if and only if every pair formed by the two image sets has zero similarity.

In one embodiment, the similarity sim(.,.) of an image pair from different sets is calculated from the histogram intersection for the image pair described in Equation (1). To simplify the similarity calculation, the similarity of two products belonging to two different sub-categories of a product (e.g., video games and portable audio/video products under the same class of product "electronics") is set to zero.

Figure 4:
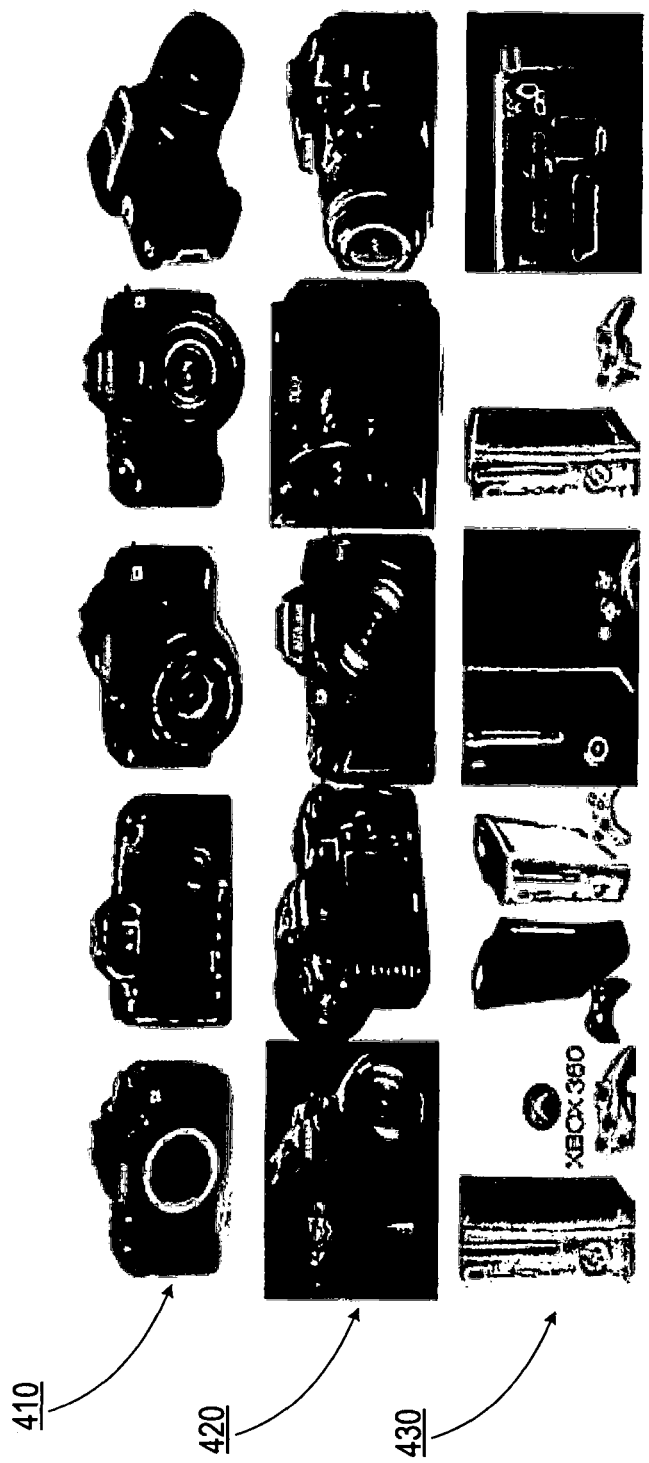
FIG. 4 is an example of product images for collectively generating product visual signatures.

FIG. 4 is an example of three sets of product images for collectively generating product visual signatures according to one embodiment of the invention. The example in FIG. 4 contains three sets of product images for three products: product image set 410 is for digital camera Canon 40D; product image set 420 is for digital camera Nikon D90; and product image set 430 is for video game console Xbox. It is noted that the products Canon 40D and Nikon D90 have very close appearances because they belong to same class of product. Generating visual signatures of products collectively enables the visual signatures of products to reflect the closeness of images of products of a same class.

From Equation (5) and Equation (6), the signature generation module 230 can derive an iterative process to solve each $v_i$ repeatedly updating each $v_i$. An example pseudo code for iteratively updating the visual signature $v_i$ is the following:

---
Input:
$\overline{V} = \{\overline{v}_1, \overline{v}_2, ..., \overline{v}_n\}$ ; /* Original accumulated BoVW representation */
Output:
$V = \{v_1, v_2, ..., v_n\}$ ; /*BoVW representation after optimization */
Process:
For each product i and j
    Compute their similarity $w_{ij}$ according to Eq. (6)
End
Initialization: t=0;
Initialize $v_i^{(t)}$ to be $\overline{v}_i$
    Iterative until t = T
        For i = 1, 2,..., n
            Update the signature of ith product according to Eq. (5), and let the result be $v_i^{(t+1)}$
        End
END
Return $V = \{v_1^{(T)}, v_2^{(T)},...,v_n^{(T)}\}$

---

Figure 5:
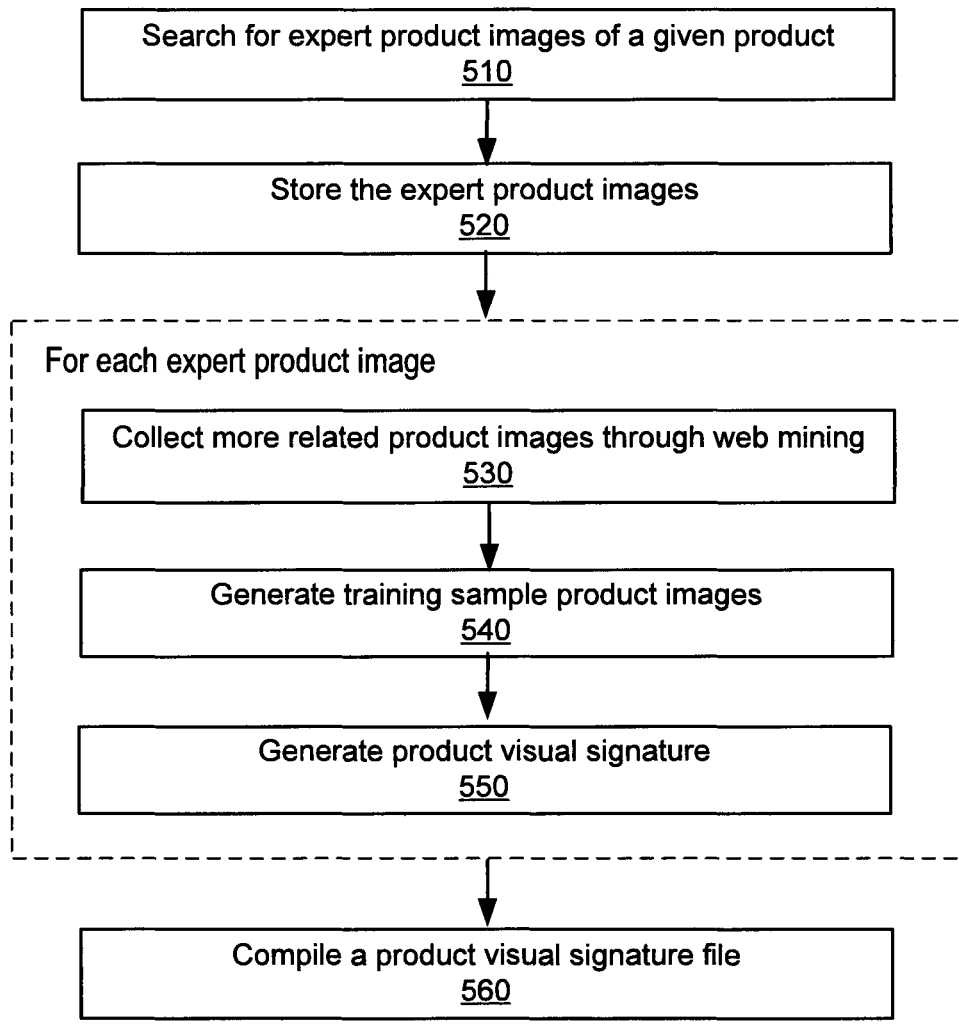
FIG. 5 is a flow chart of a process for generating a visual signature of a product according to one embodiment of the invention.

FIG. 5 is a flow chart of a process for generating a visual signature of a product according to one embodiment of the invention. Initially, the product visual signature generation module 200 searches 510 for expert product images from a repository for a product and stores 520 the expert product images in a storage place (e.g., the database1 of the product images database 106 of FIG. 1). For each expert product image, the product visual signature generation module 200 collects 530 multiple related product images through web mining (e.g., the Internet search). The product visual signature generation module 200 filters the related product images based on its corresponding expert product image and generates 540 training sample product images from the filtering. Using the training sample product images, the product visual signature generation module 200 generates 550 a visual signature for the product. The product visual signature generation module 200 compiles 560 a visual signature file containing the visual signatures for a variety of products.

In-Video Product Annotation—Product Annotation

Returning back to FIG. 2, the in-video product annotation module 102 has a video processing module 300 to annotate product in one or more video frames of a video stream. The video processing module 300 receives a video stream from a client 110 and processes one or more selected video frames of the video stream. For each selected video frame, the video processing module 300 determine whether the video frame contains a known product using the product visual signatures provided by the product visual signature generation module 200.

In one embodiment, the video processing module 300 includes a video frame extraction module 310, a feature extract and quantization module 320 and a product annotation module 330. The video frame extraction module 310 receives a video stream consisting of multiple video frames and extracts a number of key frames from the video stream. One way to extract the key frames from the video stream is to select a video frame at a fixed point of the video stream, e.g., extracting a video frame every 5 seconds of the video stream. Other embodiments of the frame extraction module 310 can use different methods, e.g., selecting the first frame of every group of pictures (GOPs) of the video stream, to obtain key frames.

The feature extract and quantization module 320 is for extracting visual features from the key frames of the video stream and quantized the extracted visual features to generate a visual representation of each key frame. In one embodiment, the feature extraction and quantization module 320 uses a Difference-of-Gaussian method to detect keypoints in a key frame and from each keypoint, the module 320 extracts 128-dimensional SIFT features. The module 320 groups the SIFT features into a number of clusters (e.g., 160,000 clusters) with hierarchical k-means. A key frame is represented by a multi-dimensional bag of visual words histogram (e.g., a 160,000-dimensional BoVW histogram).

The product annotation module 330 determines whether a key frame of a video stream contains a known product by comparing the product visual signatures with the visual representation (e.g., the 160,000-dimensional BoVW histogram) of the key frame. The comparison between a product visual signature and the visual representation of the key frame is measured by a product relevance measure defined in Equation (7):

$$s(f, v_i) = \frac{\sum_{d=1}^{D} \min\{(f_d), (v_{i,d})\}}{\min\left\{\sum_{d=1}^{D} f_d, \sum_{d=1}^{D} v_{i,d}\right\}} \quad (7)$$

where f is the key frame's visual BoVW histogram and $v_i$ the visual signature file for the i-th product. Base on the product relevance measure of the key frame and visual product features of known products, the product annotation module 330 determines whether the key frame contains a known product. In one embodiment, the estimated product relevance measure is compared with a threshold value to determine whether the key frame contains a known product.

Figure 6:
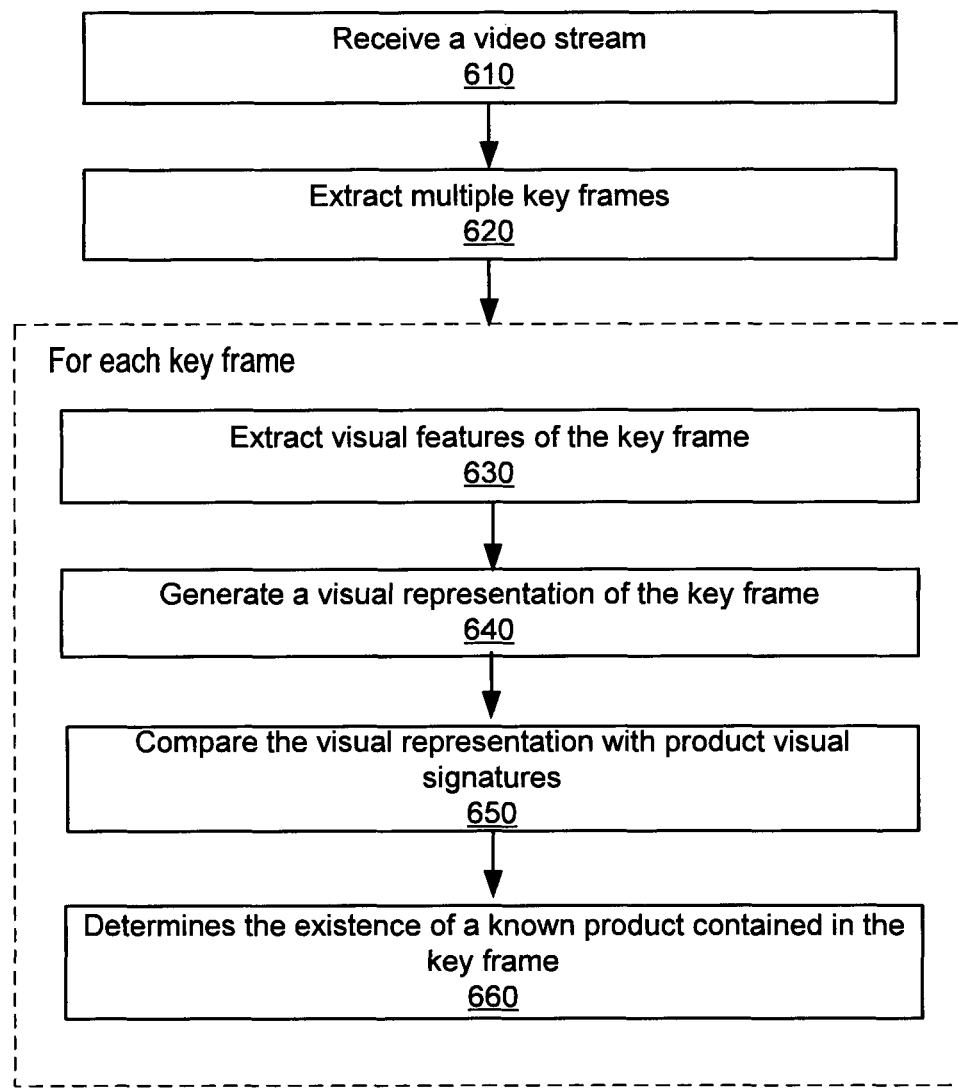
FIG. 6 is a flow chart of a process for detecting a product and annotating the detected product in one or more video frames of a videos stream according to one embodiment of the invention.

FIG. 6 is a flow chart of a process for detecting product and annotating the detected product in one or more video frames of a videos stream according to one embodiment of the invention. The video processing module 300 receives 610 a video stream from a client 110 and extracts 620 multiple key frames from the video stream. For each key frame, the video processing module 300 extracts 630 visual features (e.g., SIFT features) of the key frame and generates 620 a visual presentation of the key frame (e.g., multi-dimensional BoVW histogram). The video processing module 300 compares 650 the visual representation of the key frame with each visual signature of known products. Based on the comparison, the video processing module 300 determines 660 whether the key frame contains a known product.

Figure 7:
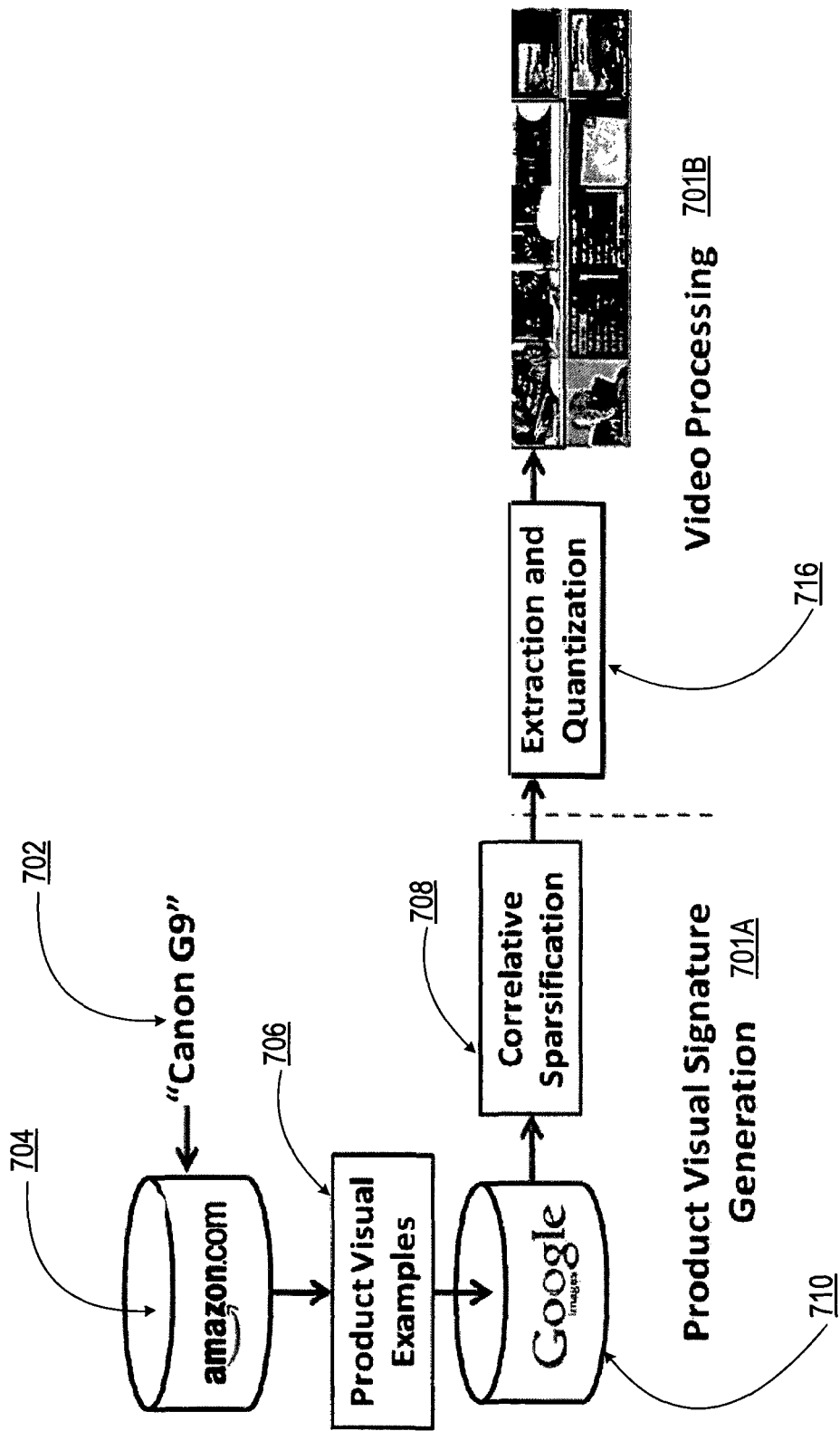
FIG. 7 is an example of an in-video product annotation system according to one embodiment of the invention.

FIG. 7 is an example of an in-video product annotation system according to one embodiment of the invention. The in-video product annotation system 700 has a product visual signature generation sub-system 701A for generating a visual signature of digital camera Canon G9 702 off-line and a video processing sub-system 701B for processing selected video frames of a video stream 712 for product annotation at runtime. The product visual signature generation sub-system 701A collects one or more expert product images at different views of Canon G9 from AMAZON™ 704 as product visual examples 706. For each expert product image of Canon G9, and the product visual signature generation sub-system 701A collects multiple associated product images from GOOGLE™ 710. Because the product images of Canon G9 from the Internet search may contain noise, the product visual signature generation sub-system 701A filters the product images from the Internet search by a correlative sparsification method 708 to reduce the noise. The filtered product images and the associated expert images form a set of training images of Canon G9 and the product visual signature generation sub-system 701A generates a visual signature for Canon G9.

The video processing sub-system 701B receives a video stream 712 and extracts 714 multiple key frames from the video stream. For each key frame, multiple visual features are extracted and quantized 716 to generate a visual representation of the key frame (e.g., a BoVW histogram). For each key frame, the video processing sub-system 701B compares the visual representation of the key frame with the visual signature of Canon G9, and based on the comparison, the video processing sub-system 101B determines whether the key frame contains the digital camera Canon G9. For illustration purpose, assuming that the product visual signature file compiled by the product visual signature generation 701A contains only the visual signature of Canon G9. If the product visual signature file contains visual signatures of more products, the video processing sub-system 701B compares the visual presentation of a key frame to each of the visual signatures to determine whether the key frame contains the product identified by the visual signature.

Experiments

To evaluate the performance of embodiments of the in-video product annotation system, 20 products from an electronics domain were selected for the evaluation, including Canon 40d, Nikon D90, Canon G9, Xbox360, and other electronics. 1044 web videos related to the selected electronics from YOUTUBE™ were collected. For each video, a keyframe was extracted every 5 seconds. Total 52,941 keyframes were extracted. Three labelers were used in the ground truth labeling of the selected electronics. For each product, the relevance of the frames of a product video was labeled via voting. Among the keyframes, there are 16,329 keyrframes that are relevant to at least one of the product and 36,162 keyframes that are irrelevant to any product. For feature representation, a Difference-of-Gaussian method was used to detect keypoints and from each keypoint 128-dimensional SIFT features were extracted. The SIFT features were grouped into 160,000 clusters with hierarchical k-means. Each product image is represented by a 160,000-dimensional BoVW histogram.

For performance evaluation metric, an average precision (AP) scheme (Equation (8)) is adopted to measure retrieval effectiveness:

$$AP = \frac{1}{R}\sum_{j=1}^{s} \frac{R_j}{j} I_j \quad (8)$$

where R is the number of true relevant frames in a set of size S, $R_j$ is the number of relevant frames in the top j results at any given index j, and j=1 if the j-th frame is relevant and 0 otherwise. Mean average precision (MAP) is the average of average precisions over all products. Three types of training data were considered for the performance evaluation:

(1) Only using AMAZON™ examples. The images are very few.
(2) Only using top GOOGLE™ image search results. There are 300 images used for each product.
(3) The proposed approach that simultaneously integrates the AMAZON™ and GOOGLE™ image search engine. There are 300 images used for each product.

The three types of training data are labeled as "Amazon-only", "Google-only" and "Amazon+Google", respectively. For product annotation algorithm, three variations of the algorithm were tested:

(1) Non-sparse: directly using the accumulated BoVW histogram of all positive training images;
(2) 1-norm sparsification: using the 1-norm sparsification method, as defined in Equation (2);
(3) Correlative sparsification: using the correlative sparisification method as defined in Equation (3).

For the second and third methods, the parameters $\lambda_1$ and $\lambda_2$ are empirically set to 5 and 0.05 respectively. The performance results (e.g., MAP results) of different combination of training data sources and annotation algorithms are demonstrated in Table I below.

TABLE I

The comparison of different image source for generating Visual Signature File

| MAP | Amazon-only | Google-only | Amazon + Google |
|---|---|---|---|
| Non-sparse | 0.16 | 0.2 | 0.18 |
| 1-norm sparsification | 0.17 | 0.31 | 0.35 |
| Correlative sparsification | 0.28 | 0.32 | 0.38 |

The results in Table I shows:

The performance of "Google-only" is better than "Amazon-only". This demonstrates that the example images on AMAZON™ are not enough to construct good visual signatures. The "Amazon+Google" outperforms "Google-only", and this confirms that effectiveness of at least one embodiment of the proposed approach.

The performance of "1-norm sparsification" is better than "Non-sparse". This is because the sparsification approach reduces the noises of the BoVW histograms. The proposed "Correlative sparsification" further improves "1-norm sparsification", and this demonstrates the effectiveness of the graph Laplacian term of Equation (3).

Figure 8:
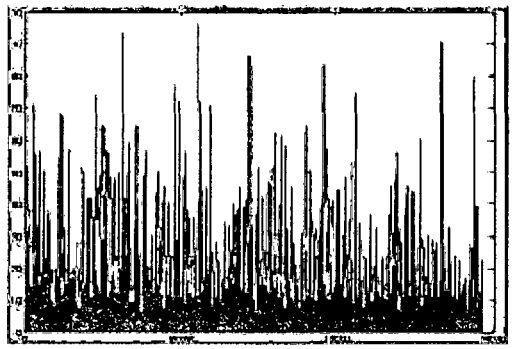
FIG. 8 is an example result of an in-video product annotation process according to one embodiment of the invention.
Figure 8:
Figure 8:
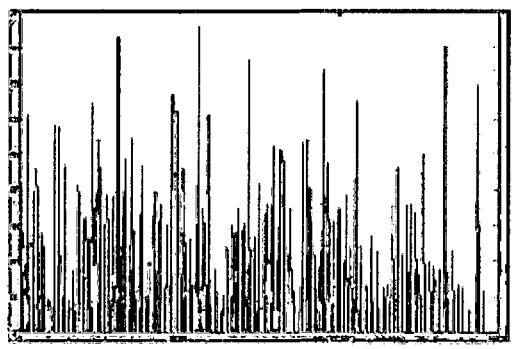
Figure 8:
Figure 8:
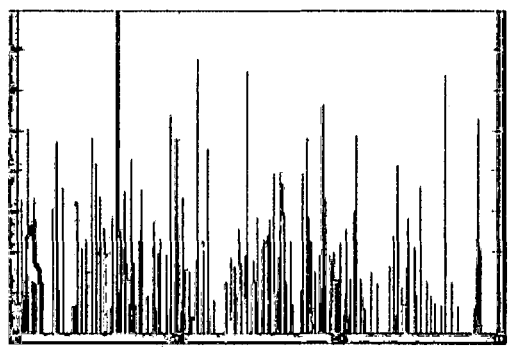
Figure 8:
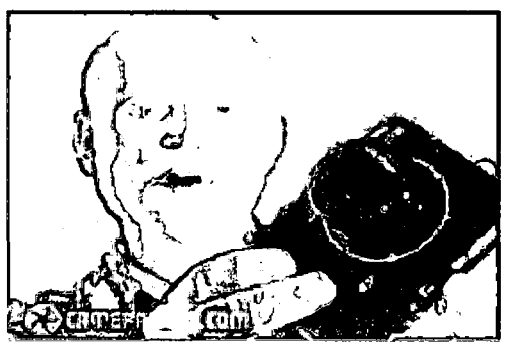

To further illustrate the results shown in Table 1, FIG. 8 is an example of a video frame processed by variations of product annotation algorithm and their corresponding visual words in a video frame. The left column contains the visual signatures (810A, 820A and 830A by different annotation methods. The visual signature 810A is generated by "No-sparse" method. The visual signature 820A is generated by "1-norm sparsification" method and the visual signature 830A is generated by "Correlative sparsification" method. The right column shows the corresponding visual words (810B, 820B and 830B) in a video frame. The examples in FIG. 8 show that sparsification methods are able to remove several noisy bins and thus the obtained visual signatures are better. The "Correlative sparsification" approach explores the correlation of multiple products and generates visual signatures with better quality.

Another embodiment of in-video product annotation described above is multi-modal product annotation, which makes use of both text information associated with a video stream. The text information associated with a video includes the video title, description and tags. By integrating text information associated with visual information of a video frame, the in-video product annotation performance can be further improved. For example, the experimental results show that pure text-based method for in-video product annotation achieves an MAP measurement of 0.23 and it is worse than the MAP 0.39 achieved by only using visual information. By integrating text and visual information, the MAP measure can be boosted to 0.55.

The embodiments of the invention advantageously provide in-video product annotation using correlative sparsification of product visual signatures. Sparse visual signatures of products are generated using expert product images and associated product images from web mining. The noise of the associated product images are reduced by the correlative sparsification. The extended training images of products from the web mining along with the expert product images enable the embodiments of the invention to generate product visual signatures, which are used to efficiently identify products contained in a video frame of a video stream at run time.

The performance of the embodiments of the invention is computationally efficient. For example, after feature extraction, the annotation of a product for a video frame actually scales with the number of non-zeros bins of the visual signature. When annotating a large dataset, an inverted structure can be built by investigating the sparsity of the product visual signatures. Therefore, the sparsification of the product visual signatures not only improves annotation performance also reduces computational cost.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of a method. It should be noted that the process steps and instructions of the invention can be embodied in software, firmware or hardware, and when embodied in software, can be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention.

We claim:

1. A computer method for providing product annotation in a video to one or more users, the method comprising:
   generating a product visual signature for a product by at least:
      collecting an unannotated expert product image of the product from an expert product repository,
      searching for a plurality of unannotated product images from a plurality of web resources different from the expert product repository, the plurality of unannotated product images related to the unannotated expert product image,
      selecting a subset of the plurality of unannotated product images by filtering the plurality of unannotated product images based on a similarity measure to the unannotated expert product image, and
      generating the product visual signature from the unannotated expert product image and the subset of the plurality of unannotated product images;
   receiving a video for product annotation, the video comprising a plurality of video frames;
   extracting a plurality of key frames from the video frames; and
   for each key frame:
      generating a visual representation of the key framed;
      comparing the visual representation with a plurality of product visual signatures including the product visual signature; and
      determining, based on the comparison, that the key frame contains the product identified by the product visual signature.

2. The method of claim 1, wherein extracting a plurality of key frames from the video comprises:
   extracting each of the plurality of key frames at a fixed point of the video.

3. The method of claim 1, wherein generating the visual signature of a key frame comprises:
   extracting a plurality of visual features from the key frame;
   grouping the plurality of visual features into a plurality of clusters; and
   generating multi-dimensional bag visual words histogram as the visual signature of the key frame.

4. The method of claim 3, wherein the plurality of visual features of a key frame are scale invariance feature transform (SIFT) descriptors of the key frame.

5. The method of claim 1, wherein generating the subset of the plurality of unannotated product images represent a set of training images for generating the product visual signature.

6. The method of claim 1, wherein generating the product visual signature further comprises:
   applying a collective sparsification scheme to the, subset of the plurality of unannotated product images, wherein information unrelated to the product contained in a related product image is reduced in generating the product visual signature.

7. The method of claim 1, wherein generating the product visual signature further comprises:
   iteratively updating the product visual signature through a pre-determined number of iterations, wherein each of the iterations computes a respective similarity measure.

8. The method of claim 1, further comprising: collecting a plurality of unannotated expert product images of the product at different views of the product, wherein the subset of the subset of the plurality of unannotated product images comprise unannotated product images corresponding to the plurality of unannotated expert product images.

9. The method of claim 1, wherein determining that the key frame contains the product identified comprises:
   estimating product relevance between the visual representation of the key frame with each product visual signature of the plurality of the product visual signatures; and
   determining that the key frame contains the product identified by the product visual signature based on the estimated product relevance.

10. A non-transitory computer-readable storage medium storing executable computer program instructions for providing on-demand digital assets hosting services to one or more users, the computer program instructions when executed by a processor cause a system to perform operations comprising:
   generating a product visual signature for a product by at least:
      collecting an unannotated expert product image of the product from an expert product repository,
      searching for a plurality of unannotated product images from a plurality of web resources different from the expert product repository, the plurality of unannotated product images related to the unannotated expert product image,
      selecting a subset of the plurality of unannotated product images by filtering the plurality of unannotated product images based on a similarity measure to the unannotated expert product image, and
      generating the product visual signature from the unannotated expert product image and the subset of the plurality of unannotated product images;

receiving a video from a user for product annotation, the video comprising a plurality of video frames;
extracting a plurality of key frames from the video; and
for each key frame:
   extracting a plurality of visual features from the key frame;
   grouping the plurality of visual features into a plurality of clusters; and
   generating a multi-dimensional bag visual words histogram as a visual representation of the key frame;
   comparing the visual representation with a plurality of product visual signatures comprising the product visual signature;
   determining, based on the comparison, whether the key frame contains the product identified by the product visual signature.

11. The computer-readable storage medium of claim 10, wherein the operations further comprise:
   extracting each of the plurality of key frames at a fixed point of the video.

12. The computer-readable storage medium of claim 10, wherein the plurality of visual features of a key frame are scale invariance feature transform (SIFT) descriptors of the key frame.

13. The computer-readable storage medium of claim 10, wherein generating the subset of the plurality of unannotated product images represent a set of training images for generating the product visual signature.

14. The computer-readable storage medium of claim 10, wherein generating the product visual signature further comprises:
   applying a collective sparsification scheme to the, subset of the plurality of unannotated product images, wherein information unrelated to the product contained in a related product image is reduced in generating the product visual signature.

15. The computer-readable storage medium of claim 10, wherein generating the product visual signature further comprises:
   iteratively updating the product visual signature through a pre-determined number of iterations, wherein each of the iterations computes a respective similarity measure.

16. The computer-readable storage medium of claim 10, wherein the operations further comprise: collecting a plurality of unannotated expert product images of the product at different views of the product, wherein the subset of the subset of the plurality of unannotated product images comprise unannotated product images corresponding to the plurality of unannotated expert product images.

17. The computer-readable storage medium of claim 10, wherein determining whether the key frame contains the product comprises:
   estimating product relevance between the visual representation of the key frame with each product visual signature of the plurality of the product visual signatures; and
   determining that thee key frame contains the product identified by the product visual signature based on the estimated product relevance.

* * * * *